UNITED STATES PATENT OFFICE.

JOHN DAMKEN, OF NEW YORK, N. Y.

IMPROVEMENT IN THE MANUFACTURE OF CONDENSED WINE.

Specification forming part of Letters Patent No. 130,282, dated August 6, 1872.

*To all whom it may concern:*

Be it known that I, JOHN DAMKEN, of the city, county, and State of New York, have invented a new and useful Improvement in the Manufacture of Condensed Wine; and I do hereby declare the following to be a full, clear, and exact description thereof, which will enable those skilled in the art to make and use the same.

This invention relates to condensed wine, which is prepared by first subjecting the wine to a distilling process so as to free the same from alcohol and to reduce the mass to about one-eighth of its original bulk, then mixing it with sugar, and boiling it down to the consistency of sirup or honey.

My invention is based on the discovery that wine, when free from alcohol, on account of the phosphoric acid contained therein, is a valuable remedy in most all diseases of children, and also in many diseases of grown persons — such as scrofula, diarrhea, fever, wounds, particularly such which show no tendency to heal, inflammations, rheumatism, weakness from exhausting diseases, such as typhus and its consequences, and diseases of the blood.

In carrying out my invention I take wine, by preference white wine from California grapes, and subject the same to a distilling process so as to free it from all the alcohol contained therein and to reduce the bulk of the wine from a gallon to a pint, or to about one-eighth of its original bulk. With the liquid thus prepared I mix a quantity of sugar, about one-quarter pound to the pint, and after the sugar has been thoroughly incorporated with the liquid I boil the mixture down to the consistency of sirup or honey. When cold I put it up in bottles of suitable sizes, ready for the market.

I am aware that cider and such other juices have been concentrated so as to reduce the quantity much below its original bulk, by which means it is held that fermentation ceases; such is not claimed by me; but

What I claim as new, and desire to secure by Letters Patent, is—

The process herein described for treating wine, by first distilling the same to free it of alcohol and reduce it in bulk, and then intermixing with such reduced quantity a specified portion of sugar, and boiling the same until the mass assumes the consistency of a thick sirup, as specified, for the purpose set forth.

JOHN DAMKEN.

Witnesses:
W. HAUFF,
E. F. KASTENHUBER.